United States Patent [19]
Breen

[11] 3,707,986
[45] Jan. 2, 1973

[54] ONE-WAY DIAPHRAGM SEAL FOR DRAINS

[76] Inventor: William J. Breen, 427 Willis Avenue, Williston Park, N.Y. 11596

[22] Filed: Feb. 19, 1971

[21] Appl. No.: 116,854

[52] U.S. Cl. ............................................. 137/525.1
[51] Int. Cl. ............................................. F16k 15/00
[58] Field of Search .......................... 137/525, 525.1

[56] References Cited

UNITED STATES PATENTS

| | | |
|---|---|---|
| 3,047,013 | 7/1962 | Baumbach .......................... 137/525.1 |
| 3,065,761 | 11/1962 | Peras ................................. 137/525 |
| 3,334,646 | 8/1967 | Billeter .............................. 137/525 |
| 2,352,642 | 7/1944 | Langdon ........................... 137/525.1 |
| 564,502 | 7/1896 | Brookes ............................ 137/525.1 |

*Primary Examiner*—Martin P. Schwadron
*Assistant Examiner*—David J. Zobkiw
*Attorney*—Leonard H. King

[57] ABSTRACT

A one-way diaphragm for use in combination with the drain of a sink, for example, is provided with a plurality of axially extending, radially oriented, double thickness flanges which are corrugated throughout substantially their entire length. The lower end of each of the flanges is split whereby water draining from the sink can flow therethrough. The diaphragm is made of resilient material so that the flanges are normally closed and provide a seal at their lower end to prevent backflow of any gases, fluids and foams into the sink.

2 Claims, 6 Drawing Figures

PATENTED JAN 2 1973
3,707,986
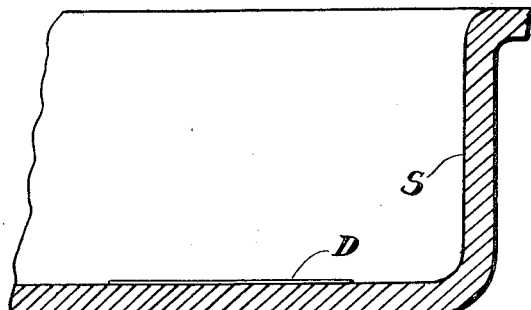
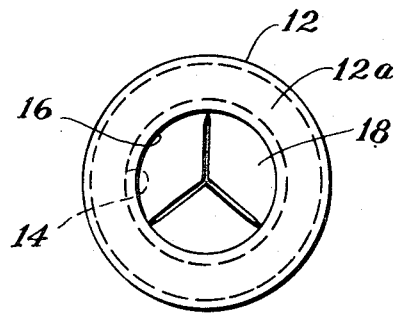
FIG. 2
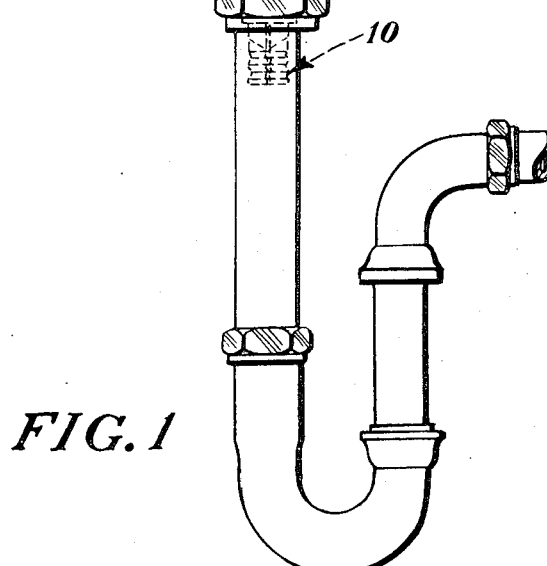
FIG. 1
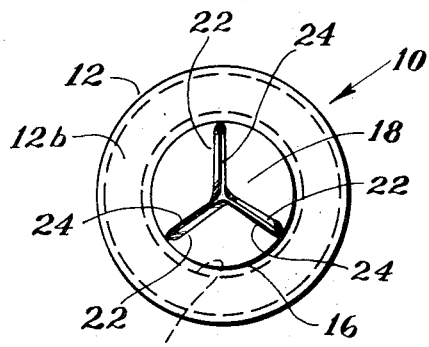
FIG. 3
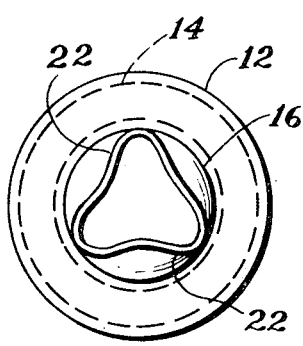
FIG. 5
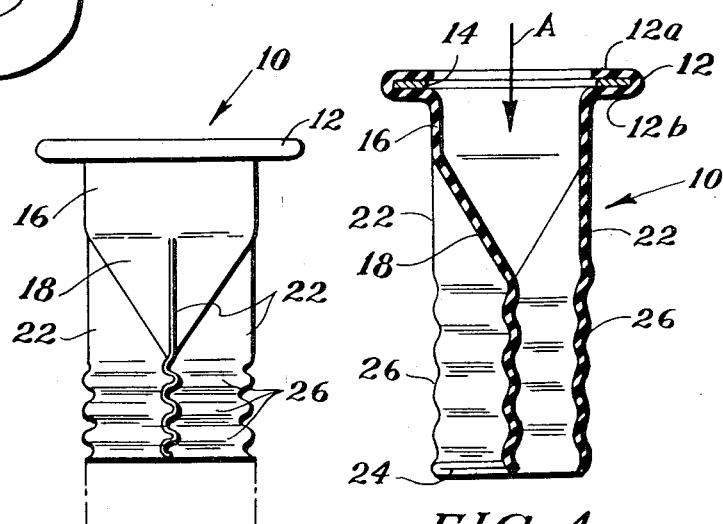
FIG. 6
FIG. 4
INVENTOR
WILLIAM J. BREEN
BY 
ATTORNEY

ONE-WAY DIAPHRAGM SEAL FOR DRAINS

The aforementioned abstract is neither intended to define the invention of the application which, of course, is measured by the claims, nor is it intended to be limiting as to the scope of the invention in any way.

This invention relates generally to a plumbing accessory and more particularly to a one-way diaphragm adapted for use in combination with a sink drain, for example.

BACKGROUND OF THE INVENTION

Because of the wide-spread use of detergents today there is presently a problem of clogging of waste water drain lines due to an accumulation of the detergent foam. This is a particular problem in high rise buildings where a column of foam can lift a substantial head of water. Should the water back up and overflow the sink, it may damage the floor including rugs, furniture and the like. If the overflow is of a sufficient quantity, as from a sewer, it can structurally damage the floor as well as plaster ceilings on the floor below, wiring and electric fixtures or the like. In addition to esthetic considerations, a back-up of unsanitary water into the kitchen sink poses a very serious health problem.

Prior art diaphragms consisted of axially extending and radially oriented flanges, the bottoms of which are slit to permit flow of water therethrough. In order to prevent backflowing of waste water, the prior art relies completely on the resiliency of the flanges to close off the slits at the bottom end thereof. However, the material of which the prior art is made must necessarily be very thin to achieve the required resiliency. Accordingly, the slits at the bottom of the flanges do not always close fully. This results in some backflow of fluid and certainly permits the backflow of gases.

The present invention very simply and effectively overcomes the problems incidental to the backing up of water and gases through the drain of a sink. The present invention provides a tubular, resilient member having, at the upper end thereof, means for seating the device in the drain of a sink. Directly below the seat is a cylindrical section and then a conical section from which depends three axially extending and radially oriented flanges. A plurality of corrugations are formed on each of the flanges which are split at the lower end thereof.

When water flows through the diaphragm the flanges open and permit egress of the water through the slit bottom ends thereof. However, because of the inherent resiliency of the device, the corrugated flanges will close and form a multiple seal along the length of the flanges when there is no flow of water and thereby prevent a backup of any foam, gas, sewage or the like.

The diaphragm comprising this invention is made of a thin, resilient material such as neoprene, rubber or the like. The device may be made by a dip forming process whereby a mold is dipped into a plastisol or rubber and then cured in a conventional manner. As is well known, the wall thickness may be built up by repeated dipping.

Accordingly, it is a primary object of this invention to provide an improved one-way diaphragm for use with kitchen sinks or the like.

Another object of this invention is to provide an improved diaphragm for kitchen sinks or the like that is of low cost, is relatively easy to install and is effective to prevent the backflow of detergent foam or other fluids.

A particular object of this invention is to provide an improved diaphragm for kitchen sinks or the like, as described above, wherein multiple seal means are provided in each of the flanges thereof.

A specific object of this invention is to provide an improved diaphragm for kitchen sinks or the like, as described above, wherein the flanges thereof are provided with a plurality of radially extending corrugations.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing, like reference characters designate like parts.

In the drawing:

FIG. 1 is an elevational view partly in section illustrating the environment of the diaphragm of the invention;

FIG. 2 is a top plan view of the diaphragm in the closed condition;

FIG. 3 is a bottom plan view of the diaphragm in the closed condition;

FIG. 4 is a sectional side elevational view;

FIG. 5 is a bottom plan view of the diaphragm in the open position; and

FIG. 6 is a side elevational view showing, in exaggerated form, the collapse of the corrugations under the influence of back pressure.

Referring now to FIG. 1, there is shown one typical environment of the present invention. The diaphragm 10 comprising the present invention is mounted in the drainline D of a sink S. To aid in the mounting, the upper end of the diaphragm 10 is provided with a transverse seat 12 consisting of folded over layers 12a and 12b. Sandwiched between the two layers 12a and 12b is a metallic ring 14 that provides stiffening means (FIG. 4). A cylindrical portion 16 extends downwardly from the seat 12 and terminates in a coaxial, tapered or conical section 18.

A plurality of axially and radially oriented double thickness flanges 22 extend downwardly from the first cylindrical portion 16 and terminates below the conical section 18. The lowermost end of the flanges 22 are radially slit as shown by reference characters 24. This construction, when taken together with the resilient characteristics of the material, permits water to flow in the direction designated by the arrow A. When water is flowing through the diaphragm 10, the flanges 22 will expand and assume a substantially cylindrical cross section (FIG. 5) of approximately the same diameter as the cylindrical portion 16 since the radial extent of all of the flanges 22 is approximately the same as the radial dimension of the cylindrical portion 16. However, when no water is flowing through the diaphragm 10, the slit lower ends 24 of the flanges 22 will assume the closed position such as shown in FIG. 4. That is, the two layers of each flange 22 will be close together and thereby prevent the backflow of any detergent foam, gas, sewage or the like.

In order to provide greater protection against the backflow of gases, sewage or the like, the flanges 22 are each provided with at least one but preferably a plurality of radially extending corrugations 26. Almost the entire length of each flange 22 includes the corrugations 26 in order to define an accordian-like structure. Thus when there is a backflow in the direction shown by the arrows F in FIG. 4, the flanges 22 will collapse as shown in FIG. 6. Because of the accordian-like structure of the flanges 22, a multiple seal is formed by the corrugations 26 that is much more effective against gases. Continued backflow will only serve to increase the seal. The contrast of the collapsed length of the flanges 22 as against the normal length is shown in FIG. 6 by the phantom outline of the flanges in their extended position.

It will be evident from the foregoing that an improved, one way diaphragm has been provided for use particularly with sink drains. The particular arrangement of sequential cylindrical and conical sections provides for full opening of the diaphragm in the direction of water flow. The same construction, together with the corrugated flanges, provides for more effective closing of the flanges in order to prevent any backflow of gas, sewage, detergent foam or the like.

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. In a resilient, one-way diaphragm of the type having a transverse seat adapted to be mounted proximate the drain of the sink and a tubular body dependent from the seat for defining a plurality of double thickness, axially extending flanges that are slit at the lowermost end thereof and are radially oriented with respect to the longitudinal axis of the diaphragm, the slits being normally closed whereby fluid can flow downwardly through the diaphragm by opening the slits but whereby the fluid cannot flow upwardly in the opposite direction, the improvement comprising at least one radially extending corrugation in each of the flanges, said corrugations originating proximate the longitudinal axis of the diaphragm and forming complementary surfaces on the inside and outside surfaces of the diaphragm whereby in the event of a back flow of fluid, the flanges will tend to collapse under the pressure of the fluid in the vicinity of the corrugations and thereby form a multiple seal.

2. The diaphragm in accordance with claim 1 wherein there are a plurality of said corrugations in each said flange.

* * * * *